July 29, 1924.
E. BERGVE
1,503,259
PROCESS FOR THE PRODUCTION OF CONCENTRATED NITRIC ACID
Filed Oct. 14, 1921
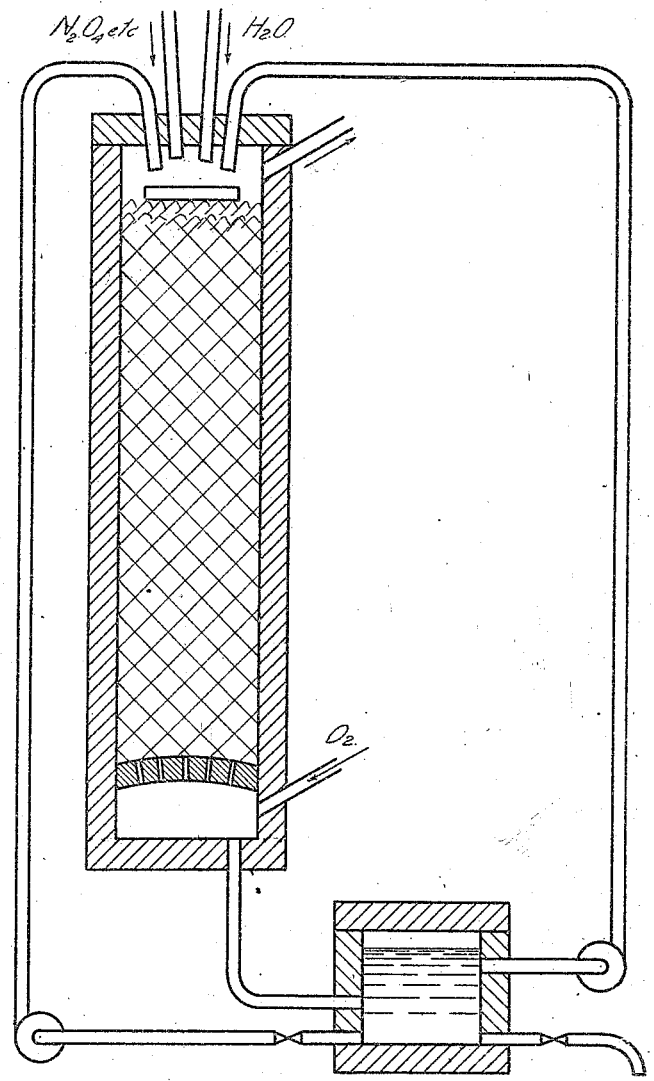
Inventor
Einar Bergve,
By Henry ........
  atty Patented July 29, 1924.

1,503,259

UNITED STATES PATENT OFFICE.

EINAR BERGVE, OF SKOIEN, NEAR CHRISTIANIA, NORWAY, ASSIGNOR TO NORSK HYDRO-ELEKTRISK KVAELSTOFAKTIESELSKAB, OF CHRISTIANIA, NORWAY.

PROCESS FOR THE PRODUCTION OF CONCENTRATED NITRIC ACID.

Application filed October 14, 1921. Serial No. 507,719.

*To all whom it may concern:*

Be it known that I, EINAR BERGVE, a subject of the King of Norway, residing at Skoien, near Christiania, Norway, have invented certain new and useful Improvements in Processes for the Production of Concentrated Nitric Acid; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention has for its object a process for the production of concentrated nitric acid. It is known to produce concentrated nitric acid from liquid nitrogen oxides, oxygen and water or dilute nitric acid by mixing water or dilute nitric acid with the liquid nitrogen oxides and then oxidizing the mixture with oxygen. It is necessary either to effect the oxidation under pressure or to use an excessive amount of nitrogen oxides.

In the latter case two layers of liquid are produced, the upper consisting of a homogenous mixture of nitrogen oxides and nitric acid without water and the lower consisting of nitric acid of 80-90% which is saturated with nitrogen oxides. For the production of concentrated nitric acid the use of the upper, non-aqueous layer of liquid appears to be the most expedient method, the lower layer being then separated therefrom and the nitric oxides contained in the upper layer being expelled, so that the concentrated nitric acid remains, while the lower aqueous layer is further treated with nitrogen oxides and oxygen. It is this process that has been used up till now.

This process, however, involves the drawback that a large quantity of the nitric acid evaporates together with the nitrogen oxides.

I have now discovered that the oxidation takes place principally in the non-aqueous layer of liquid. Experiments that have been effected on the basis of this observation have proved that it is more advantageous to let the upper, non-aqueous layer of liquid return to the process to act upon new quantities of water or dilute nitric acid respectively and oxygen while the aqueous layer containing a highly concentrated nitric acid of 80-90% concentration is removed and if required further treated by known methods to produce acid of a still higher concentration.

The cost of further concentrating this acid to a commercial product of 94-97% is nothing compared to the above mentioned drawback involved by the use of non-aqueous liquid.

The process can for instance be carried into effect in an apparatus of the following construction:

Dilute nitric acid and liquid nitric oxides are supplied to a tower filled with quartz. Oxygen is introduced at the bottom of the tower from where the reaction product flows into a vat and is separated into two layers. The upper, non-aqueous layer is pumped into the tower again whilst the lower layer is drawn out and subjected to further treatment.

A constructional form of such an apparatus is illustrated in the accompanying drawing.

It may also be advisable to pump a part of the lower layer into the tower again so that a mixture of the liquid of both layers can circulate together, while the remainder is drawn out for further concentration.

More than one apparatus may also be used so that part of the raw mixture of the reaction products in the first tower is conducted into a separate vat under another tower.

I claim:

1. A process for the production of highly concentrated nitric acid, comprising the steps of reacting upon an excess quantity of liquid nitrogen oxides with oxygen and an aqueous liquid, removing the aqueous layer of the resulting reaction product, and returning the non-aqueous layer of the said reaction product into the process.

2. A process for the production of highly concentrated nitric acid, comprising the steps of reacting upon an excess quantity of liquid nitrogen oxides with oxygen and an aqueous liquid, removing the aqueous layer of the resulting reaction product, and returning the non-aqueous layer of the said reaction product into the process together with a part of the hydrous layer.

3. A process for the production of highly concentrated nitric acid, comprising reacting upon an excess quantity of liquid nitrogen oxides with an aqueous liquid and oxygen, separating by gravity the resulting product into layers of an aqueous and a non-aqueous product and returning the non-aqueous product into the cycle of operations.

In testimony that I claim the foregoing as my invention, I have signed my name in presence of two subscribing witnesses.

EINAR BERGVE.

Witnesses:
 MARIE BERGQUIST,
 INGOLF HARALDSEN.